(12) United States Patent
Kudo et al.

(10) Patent No.: US 7,343,012 B2
(45) Date of Patent: Mar. 11, 2008

(54) RECORDING AND PLAYBACK APPARATUS FOR STREAM DATA AND TRANSMISSION METHOD FOR STREAM DATA

(75) Inventors: Yoshimichi Kudo, Tokyo (JP); Hitoaki Owashi, Tokyo (JP); Atsushi Yoshioka, Tokyo (JP); Hiroo Okamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 807 days.

(21) Appl. No.: 10/006,681

(22) Filed: Dec. 10, 2001

(65) Prior Publication Data

US 2002/0114462 A1 Aug. 22, 2002

(30) Foreign Application Priority Data

Feb. 16, 2001 (JP) .............................. 2001-039339

(51) Int. Cl.
*H04N 7/167* (2006.01)
(52) U.S. Cl. ........................... 380/201; 726/26; 726/31
(58) Field of Classification Search ................ 713/200, 713/201, 188, 194, 2, 1; 710/3; 711/101–104; 709/222; 380/200, 201, 255, 277; 726/2, 726/26, 31; 386/40, 66, 79, 94
See application file for complete search history.

(56) References Cited

U.S. PATENT DOCUMENTS

| | | | |
|---|---|---|---|
| 5,602,750 A * | 2/1997 | Severt et al. ................ | 702/122 |
| 5,764,607 A | 6/1998 | Maeda et al. | |
| 5,987,126 A | 11/1999 | Okuyama et al. | |
| 6,282,654 B1 * | 8/2001 | Ikeda et al. .................... | 726/31 |
| 6,314,518 B1 * | 11/2001 | Linnartz ...................... | 713/176 |
| 6,542,610 B2 * | 4/2003 | Traw et al. .................. | 380/262 |
| 6,571,220 B1 * | 5/2003 | Ogino et al. .................. | 705/51 |
| 6,584,552 B1 | 6/2003 | Kuno et al. | |
| 6,622,249 B1 * | 9/2003 | Komuro et al. ............... | 726/31 |
| 6,748,485 B1 | 6/2004 | Yokota et al. | |
| 6,834,348 B1 * | 12/2004 | Tagawa et al. ............. | 713/193 |
| 2001/0012440 A1 * | 8/2001 | Itoi .............................. | 386/94 |
| 2001/0023484 A1 * | 9/2001 | Ichimura ..................... | 713/193 |
| 2001/0023487 A1 * | 9/2001 | Kawamoto ................... | 713/202 |

FOREIGN PATENT DOCUMENTS

| | | |
|---|---|---|
| JP | 10-162559 A | 6/1998 |
| JP | 11-205310 | 7/1999 |

OTHER PUBLICATIONS

Japan Patent Office (JPO) office action dated Aug. 24, 2007 for JPO patent application JP2001-039339.

\* cited by examiner

*Primary Examiner*—Hosuk Song
*Assistant Examiner*—Joseph Pan
(74) *Attorney, Agent, or Firm*—Townsend and Townsend and Crew LLP (57) ABSTRACT

In transmission of stream data protected for copyright on a bus, transcription of stream data once recorded on a recording apparatus to a medium of another recording apparatus is realized. Authentication is carried out between a stream recording and playback apparatus and another recording apparatus to interchange a key for data scramble. By using this key, data is added with copy control information used when the data is recorded initially and thereafter the data is transmitted. After the data has been recorded on the recording apparatus, the data is deleted from an original recording medium. During transmission of the data, authentication from a different apparatus is rejected to prevent a plurality of copies from being made.

6 Claims, 6 Drawing Sheets

RECORDING AND PLAYBACK APPARATUS FOR STREAM DATA AND TRANSMISSION METHOD FOR STREAM DATA

BACKGROUND OF THE INVENTION

The present invention relates to a stream data recording and playback apparatus for recording and playback of stream data such as digital video/audio signals and a method for transfer of data in the stream data recording and playback apparatus.

With the development of digital video signal processing techniques and recording and playback techniques, settop boxes (STB's) for reception of satellite broadcast or CATV, digital broadcast receiver sets such as digital TV's, digital VTR (Video Tape Decoder, or VCR (Video Casette Recorder))'s, disk recorders and the like have been realized as household apparatuses. When a video/audio signal is transmitted and received between the digital AV apparatuses, it is desirable for the purpose of preventing degradation in signal quality that the signal be transmitted as stream data while keeping the digital signal format. Available as a digital interface optimized for transmission of such stream data is a fast serial bus defined by IEEE 1394-1995 standards, which bus will hereinafter be referred to as a 1394 bus. The 1394 bus meets conditions for connection of the AV apparatus by permitting maximal 63 devices to be connected freely in tree connection and by being provided with an isochronous transfer scheme that has a maximum transfer rate of 400 Mbps and is suitable for transmission of data necessary to be transmitted on real time such as a video/audio stream.

In the recording and playback apparatus such as a digital VTR (or VCR), on the other hand, recording/playback of signals is carried out digitally, so that a change in signal quality attributable to repetitive recording/playback operations does not occur essentially and copies identical to an original can be created easily many times. This will give rise to a possibility that many copies duplicate to an original can be reprinted, amounting up to a great number of copies in excess of the range of domestic use, even in the case of video/audio data (contents) conserved for copyright.

As a technique for prevention of the unauthorized copy of contents, a DTCP (Digital Transmission Contents Protection) scheme has been adopted in the 1394 bus. In the DTCP scheme, data for authentication is assigned to AV apparatuses, one by one, for handling a video/audio stream with copyright reserved, that is, a broadcast receiver set, a recording and playback apparatus and a display apparatus, a stream applied with a scramble process is sent from an apparatus on the stream transmitting side (hereinafter referred to as a source device) in order that transmission of data is permitted between only apparatuses that succeed in mutual authentication and an apparatus on the stream receiving side (hereinafter referred to as a sink device) that has acquired key data for release of the scramble in advance on the basis of the authentication receives and decodes the stream to play back or record the stream.

The video/audio stream is assigned with copy control information describing conditions for copying of data and data copying is sorted into any of three modes of "copy free", "copy never" and "copy one generation". The recordable apparatus such as the digital VTR is permitted to receive and record only a stream subject to "copy free" or "copy one generation" and after having recorded a stream subject to "copy one generation", it changes the copy control information to "no more copies". The apparatus for playback and display of video/audio signals such as the digital TV can receive and plays back streams regardless of the copy control information.

One may refer to, for example, JP-A-11-205310 as describing the aforementioned technique.

In the DTCP scheme, once contents subject to "copy one generation" is recorded on the recording and playback apparatus, copy control information for the contents is thereafter changed to "no more copies", thus inhibiting other recording apparatus from recording the contents any more. On the other hand, a stream recording/playback apparatus for recording video/audio stream data by using a hard disc drive (HDD), such as a so-called HDD recorder", has recently been realized. In the HDD recorder, the drive is fixed in the apparatus and the capacity is limited and therefore, from the standpoint of easy-to-handle operation, it is desirable that the user delete contents once played back and unnecessary to be conserved thereafter from the disk, keep contents desired to be played back later in the disk and with the empty capacity of the disk lessened, transfer the contents to be kept to a VTR or optical disc apparatus so that the contents may be stored in a holding medium such as a tape or optical disc.

In the copyright protection method described as above, contents once recorded in the recording medium is managed as "no more copies" and consequently, cannot be copied again to the holding medium, with the result that conservation by the user as described above cannot be realized.

SUMMARY OF THE INVENTION

An object of the present invention is to provide a stream data recording and playback apparatus capable of permitting the user to transcribe contents from a primary storage medium to a holding medium while protecting copyright of the contents.

According to the invention, to accomplish the above object, when contents temporarily stored in a stream recording and playback apparatus is played back with the aim of transcribing the contents to a different recording apparatus, authentication of apparatus is made mutually between the stream recording and playback apparatus and the different recording apparatus to interchange key data for contents scramble so as to enable the apparatuses to possess the key data in common. Then, stream data scrambled using the key data is transmitted to the recording apparatus by designating one transmission channel and at the time that the contents transmission ends, the contents is deleted to thereby implement transcription of the contents. During the execution of transcription, a request for authentication made by a different receiving apparatus to that channel is rejected to ensure that the contents cannot be received at a time by a plurality of apparatuses.

DESCRIPTION OF THE EMBODIMENTS

Figure 1:
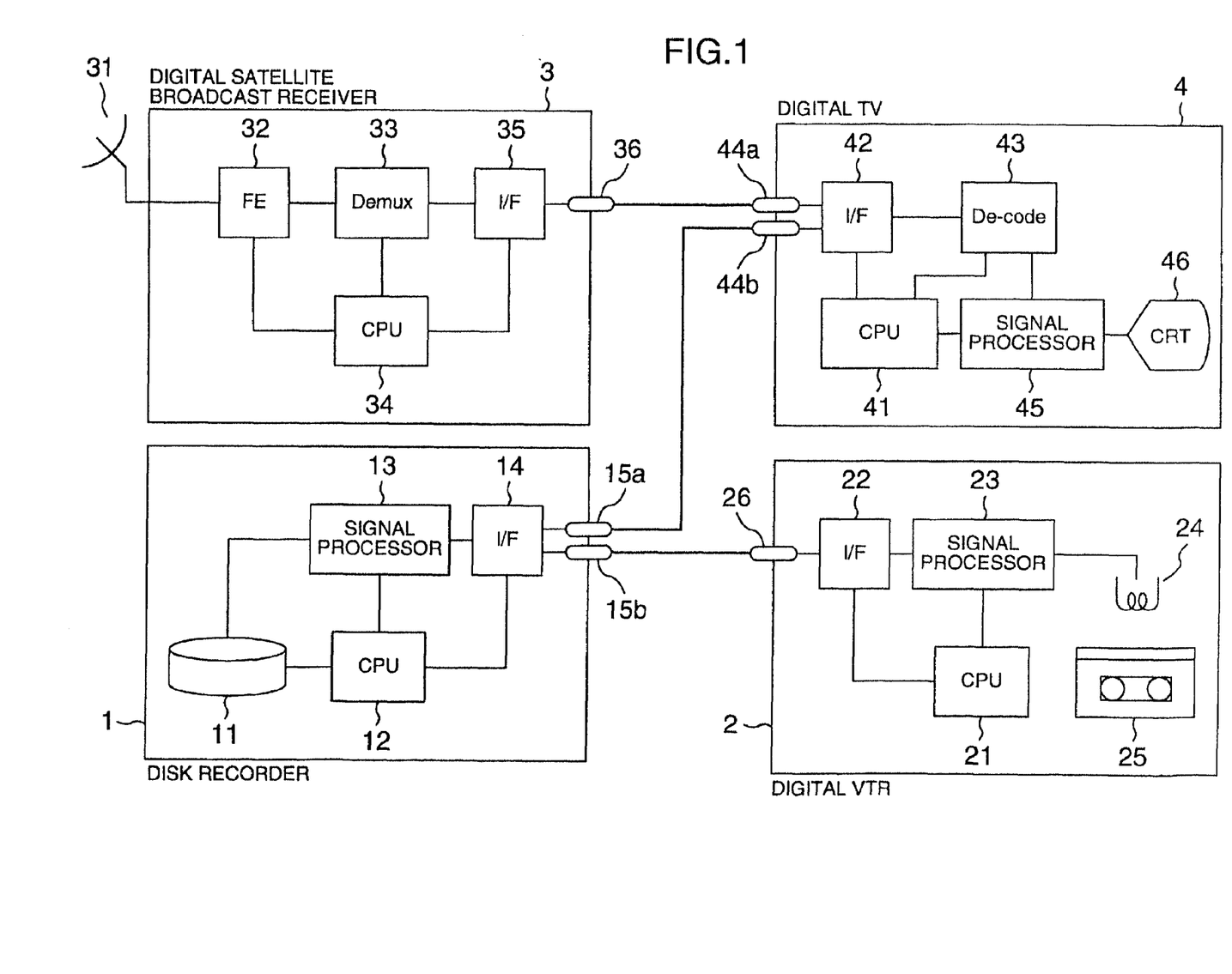
FIG. 1 is a block diagram showing detailed construction of an AV system including a stream data recording and playback apparatus according to an embodiment of the invention.

Embodiments of the present invention will now be described with reference to the accompanying drawings. Referring first to FIG. 1, there is illustrated an AV system constructed by using a hard disc recorder representing an embodiment of a stream data recording and playback apparatus according to the invention. The AV system comprises a digital satellite broadcast receiver set 3, a digital TV 4, a hard disk recorder 1 and a digital video tape recorder 2. These devices are coupled to each other through a 1394 bus.

In the digital satellite broadcast receiver set 3, a signal received by an antenna 31 is demodulated by means of a front end 32, desired program data is selected from a multiplexed transport stream at a demultiplexer 33 and the selected data is delivered as a stream from an interface 35 onto the bus through a terminal 36. A CPU 34 executes programs stored in a built-in memory or a memory, not shown, so as to control individual components of the digital satellite broadcast receiver set 3. Further, the CPU 34 conducts such processes as reading electronic program guide (EPG) information from the received transport stream to create screen data for operation inclusive of screen data for presenting the read information to the user and transmit the screen data to the 1394 bus and transmitting/receiving control commands through the 1394 bus.

In the digital TV 4, the stream transmitted on the 1394 bus is received by an interface 42 through a terminal 44a or 44b, the received stream is decoded to video and audio data by means of a decoder 43 and video data is displayed on a CRT 46 through a signal processing circuit 45. Audio data, on the other hand, passes through an audio signal processing circuit, not shown, so as to be reproduced from a loudspeaker, not shown. A CPU 41 executes programs stored in a built-in memory or a not-shown memory to control individual components of the digital TV 4. Further, the CPU 41 receives screen data for controlling other apparatus connected through the medium of the 1394 bus to draw the data in a memory included in the signal processing circuit 45 so as to display that data or transmits/receives commands for controlling other devices.

In the disk recorder 1, a stream transmitted on the 1394 bus is received by means of an interface 14 through a terminal 15a and the received stream is converted into a data format for write to a disk 11 by means of a signal processing circuit 13 and recorded on the disc 11. Conversely, a signal read out of the disk 11 is converted into a stream format for transfer by means of the signal processing circuit 13 and then transmitted as a stream from the interface 14 onto the 1394 bus through terminal 15a or 15b. A CPU 12 executes programs stored in a built-in memory or a not-shown memory to control individual components of the disk recorder 1. Further, the CPU 12 conducts such processes as preparing screen data indicative of operation contents of the disk device 1 to transmit the data to the 1394 bus and transmitting/receiving control commands through the 1394 bus.

In the digital VTR 2, a stream transmitted on the 1394 bus is received by an interface 22 through a terminal 26. The received stream is converted into a format of recording onto a tape medium by means of a signal processing circuit 23 and recorded on a tape 25 from a head 24 mounted to a rotary drum not shown. Conversely, data read out of the tape 25 by means of the head 24 is converted into a stream format for transfer by means of the signal processing circuit 23 and is then transmitted from the interface 22 to the 1394 bus through the terminal 26. A CPU 21 conducts such processes as executing programs stored in a built-in memory or a not-shown memory to control individual components of the digital VTR 2, preparing screen data indicative of operation contents of the digital VTR 2 to transmit it to the 1394 bus and transmitting/receiving commands for control through the 1394 bus.

Figure 2:
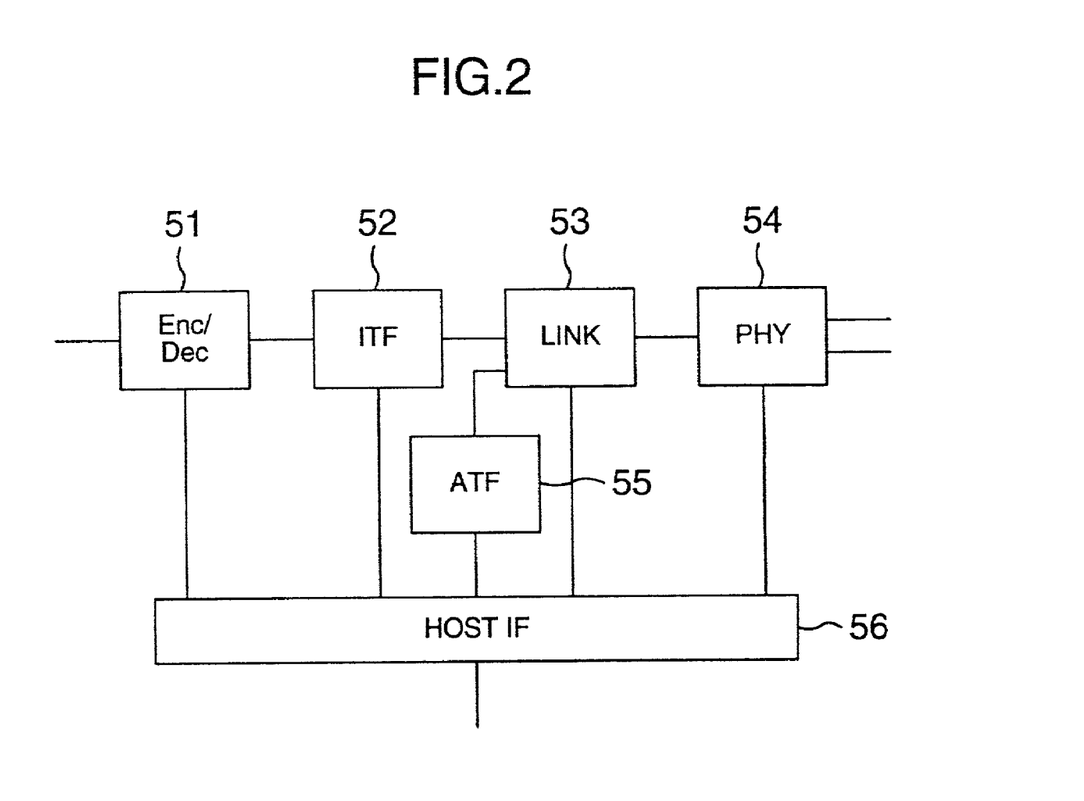
FIG. 2 is a block diagram showing detailed construction of interface means of the stream recording and playback apparatus according to an embodiment of the invention.

Referring to FIG. 2, detailed construction of the interfaces 14, 22, 35 and 42 is illustrated. The individual interfaces are implemented with the construction common to the individual sections. A physical layer processor (PHY) 54 connecting to the 1394 bus and a link layer processor (LINK) 53 respectively execute physical layer and link layer processes prescribed by the IEEE 1394 standards, the input/output of the link layer processor 53 is connected to an isochronous tansfer FIFO 52 for storing data transferred on the 1394 bus in the isochronous transfer mode and to an asynchronous transfer FIFO 55 for storing data transferred on the 1394 bus in the asynchronous transfer mode, and the input/output of the isochronous transfer FIFO is applied, as necessary, with a scramble process or a de-scramble process by means of a data encrypting/decrypting means 51 and thereafter connected to, for example, the signal processor inside the device. The input/output of the asynchronous transfer FIFO 55 is connected to the CPU inside the device through a host interface 56. The CPU transmits/receives control commands transmitted/received to/from the 1394 bus in the asynchronous transfer mode and besides, controls the individual components of the interface through the host interface 56.

Next, operation of the AV system shown in FIG. 1 will be described. Firstly, in case programs broadcasted by digital satellite broadcasting are received by means of the digital satellite broadcast receiver set 3 and watched and listened by means of the digital TV 4, a desired program is selected in the digital satellite broadcast receiver set 3, the selected program is sent as a stream onto the 1394 bus and the stream is received by the digital TV 4 so as to be played back and displayed. For the 1394 bus, two modes of isochronous transfer and asynchronous transfer are prescribed. When the stream of broadcasting program is transferred on real time, the isochronous transfer mode is typically used. For control of the transmission format of stream data and of the stream transmission/reception, a method prescribed by the IEC 61883 standards may be used.

Figure 3:
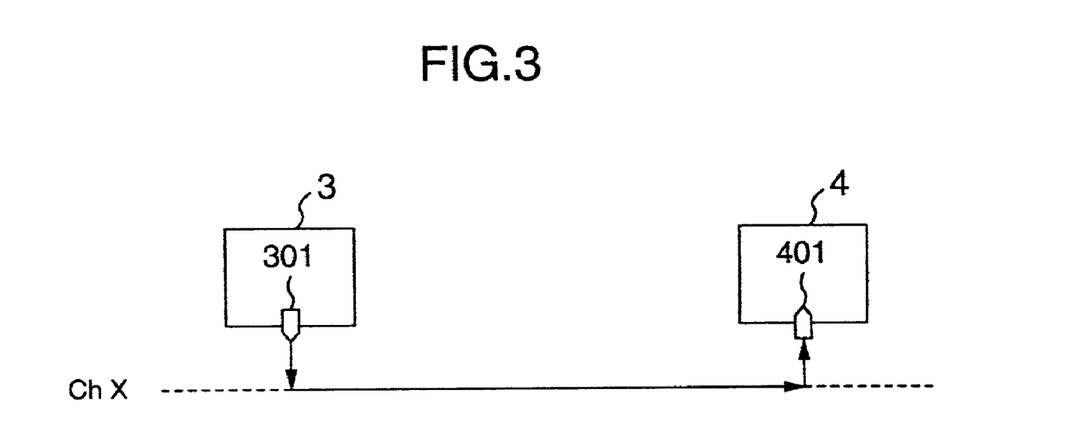
FIG. 3 is a diagram showing a method for transmission of data between a digital satellite broadcast receiving apparatus and a digital TV.

FIG. 3 shows a logical connection form when stream data is transmitted from the digital satellite broadcast receiver set to the digital TV in accordance with the stream data transmission control method prescribed in the IEC 61883 standards. In the IEC 61883 standards, an input/output port for virtual stream data called "plug" is provided and a "connection" representing the logical connection is established between plugs so as to prescribe stream data transmitting and receiving apparatuses.

An example of FIG. 3 shows that an output plug 301 of the digital satellite broadcast receiver set 3 is connected to an input plug 401 of the digital TV 4 by using an isochronous data channel X on the 1394 bus and stream data is transmitted by using this channel X. Control of stream data transmission and reception is executed by carrying out write to plug control registers provided in bus address spaces of the individual devices connected to the 1394 bus. For example, a connection is established by writing a transmission channel X, as a setting value, from the digital TV 4 to an output plug register of the digital satellite broadcast receiver set 3 and causing the digital TV to set an input plug register of its own to reception of the channel X, thereby enabling the satellite broadcast receiver set 3 to transmit a stream to the digital TV 4 by using the channel X.

The connection can be established from the digital TV 4 side, that is, from the sink side as described above but alternatively, the connection establishment can be accomplished from the satellite broadcast receiver set, that is, from the source side. In addition, the connection can also be established by transmitting a command for connection establishment from the source side to the sink side. When the stream data transmission ends, the established connection is broken by writing data for releasing the connection using the channel X to the input plug register and output plug register of each device. It is to be noted that in the IEC61883 standards, a point to point connection for connecting the input and output plugs and a broadcast connection for connecting input or output plug and the isochronous data channel are defined but the point to point connection is simply referred to as "connection" in the foregoing and will hereinafter be done so unless noticed in particular.

Figure 4:
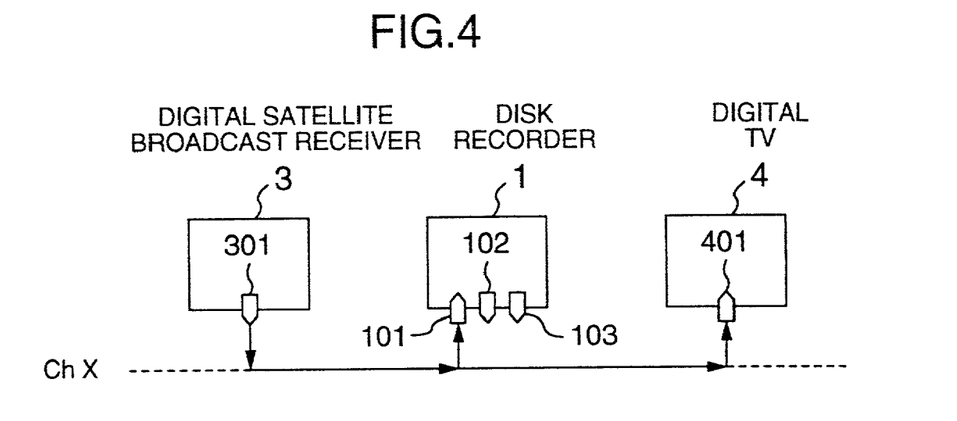
FIG. 4 is a diagram showing a method for transmission of data between the stream recording and playback apparatus and the digital satellite broadcast receiving apparatus and digital TV according to an embodiment of the invention.

Next, operation when the disk recorder 1 records satellite broadcast programs will be described. In this case, as shown in FIG. 4, a connection is established between the output plug 301 of satellite broadcast receiver set 3 and an input plug 101 of disk recorder 1 and a stream of a program is transmitted and recorded on the disk in the disk recorder 1. At that time, a so-called recording monitor can be carried out in which the stream of the same channel X is received by means of the digital TV 4 so that an image of the stream being recorded on the disk recorder may be decoded and displayed.

In the IEC61883, it is possible to add a connection to the connection established precedently so as to permit another apparatus to also use the stream of the same channel. This subsequent addition of connection is called "overlay". As shown in FIG. 4, a connection is established between the output plug of digital satellite broadcast receiver set 3 and the input plug 401 of digital TV 4. In this case, it is also possible to overlay the connection to the input plug 101 of disk recorder 1 on the connection initially established to transmit a stream from the digital satellite broadcast receiver set 3 to the digital TV 4 for watching and listening the stream. Alternatively, it is possible to overlay the connection to the input of digital TV 4 on the connection from the digital satellite broadcast receiver set 3 to the disk recorder 1. As in the case of playback or watching and listening, the connection establishment may be carried out from the side of any one of the devices of satellite broadcast receiver set 3, digital TV 4 and disk recorder 1 or may be executed by a transmission destination apparatus by sending a command thereto.

Various forms of operation conducted by the user when recording operation is performed can be considered. In one way, a command inputted by operating, for example, a remote controller while watching a GUI screen displayed on the digital TV 4 may be transmitted as a command from the TV to the digital satellite broadcast receiver set 3 and disk recorder 1 through the 1394 bus or the user operation may be realizable through a method in which a GUI screen created by the digital satellite broadcast receiver set 3 or disk recorder 1 is sent to the digital TV 4 so as to be displayed thereon and an operation is carried out by operating a remote controller or a panel on the side of digital satellite broadcast receiver set 3 or disk recorder 4 to perform recording.

For a command for operating the digital satellite broadcast receiver set 3 or disk recorder 1 from the digital TV 4 or for establishing a connection to the transmission destination apparatus, an AV/C command set defined as command specifications for controlling AV apparatus by the 1394 Trade Association may be used pursuant to command transfer protocol defined in the IEC61883 standards. As a method for transmission of the GUI screen to another apparatus, there is available a method defined in the EIA775A standards, a method using a panel sub-unit indicated by the aforementioned AV/C command set specifications or a method for implementing a GUI defined in HAVi (Home Audio Video interoperability) specifications that define network control specifications of the AV apparatus.

Figure 5:
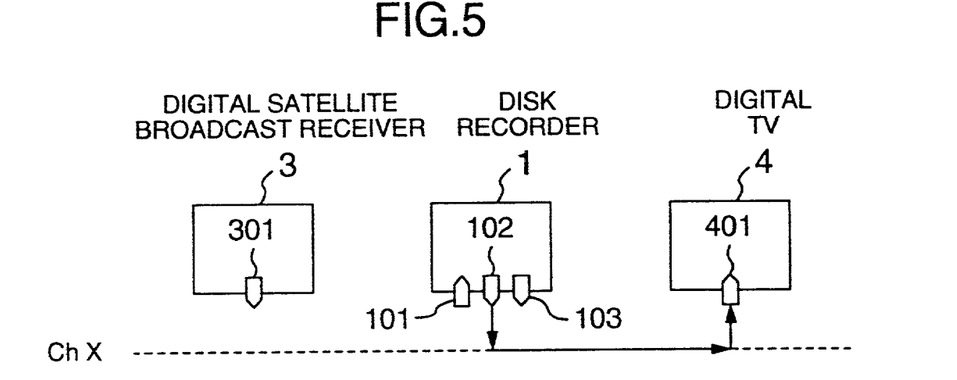
FIG. 5 is a diagram showing a method for transmission of data between the stream recording and playback apparatus and the digital satellite broadcast receiving apparatus and digital TV according to an embodiment of the invention.

Next, an instance will be described in which broadcast programs recorded on the disk recorder 1 are played back so as to be displayed on the digital TV 4. FIG. 5 shows a transmission status of a stream when the stream is transmitted from the disk recorder 1 and displayed on the digital TV 4. In this case, a connection is established from an output plug 102 of disk recorder 1 to the input plug 401 of digital TV 4 to permit the stream to be transmitted and the stream received by the digital TV 4 is decoded and displayed. As in the case of playback and recording, various forms of the apparatus that establishes the connection and the method of operation by the user can be considered.

Figure 6:
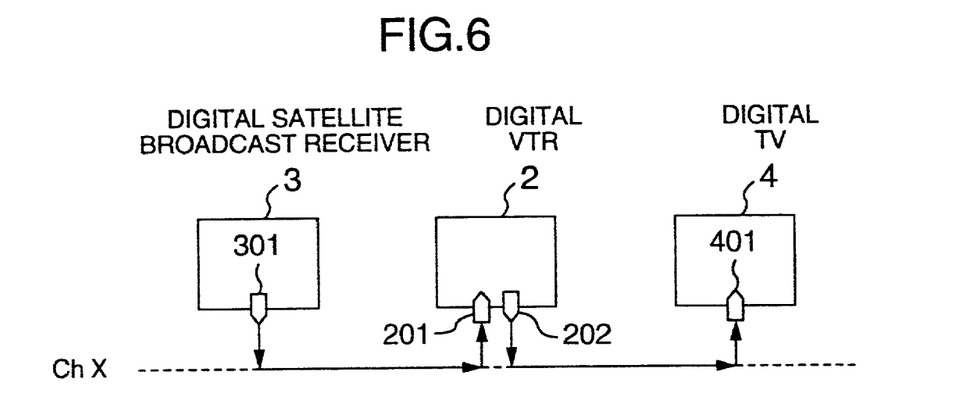
FIG. 6 is a diagram showing a method for transmission of data between a digital VTR and the digital satellite broadcast receiving apparatus and digital TV.

In an instance where a stream is recorded or played back by means of the digital VTR 2, too, a connection is established as shown in FIG. 6 between an input plug 201 or output plug 202 of digital VTR 2 and the output plug 301 of digital satellite broadcast receiver set 3 or the input plug 401 of digital TV 4, like the instance of disk recorder, to permit transmission of the stream.

The foregoing description has been given without considering a case where limitation on copy is applied to programs received through satellite broadcast. Thus, when a program received through, for example, satellite broadcast and recorded on the disk recorder is transmitted as a stream onto the bus and the stream is received by another disk recorder or digital VTR, the program can be copied. In each of the IEEE1394 standards and the IEC61883 standards, limitation is not particularly imposed on the apparatus allowed to transmit and receive the stream and therefore, a stream flowing on the bus can essentially be received and utilized by any other apparatus by overlaying the connection as described previously and one stream can be recorded simultaneously by means of a plurality of apparatuses to prepare many copies.

Under the circumstances, when among broadcast programs, contents of movies for instance, for which copyright is reserved to make it necessary to impose limitation on preparation of copies for the purpose of protecting the right of a copyright holder, is transmitted on the 1394 bus, the DTCP (Digital Transmission Content Protection) scheme defining copyright protection specification on the 1394 bus is used with a view to preventing the contents as above from being copied unlimitedly.

According to the DTCP scheme, when contents with copyright reserved with its copying limited is to be transmitted as a stream on the 1394 bus, mutual authentication between partner apparatuses is carried out by using information for authentication precedently built in the apparatuses, contents is scrambled only when the authentication is successful to enable the partner apparatuses to mutually possess key data for transmission in common, a stream representative of encrypted contents is transmitted from the source apparatus side onto the 1394 bus and the stream received by the sink side is decrypted by using the key processed in common, thereby ensuring that transmission/reception of the contents can be permitted only between the apparatuses having the information for authentication.

Figure 7:
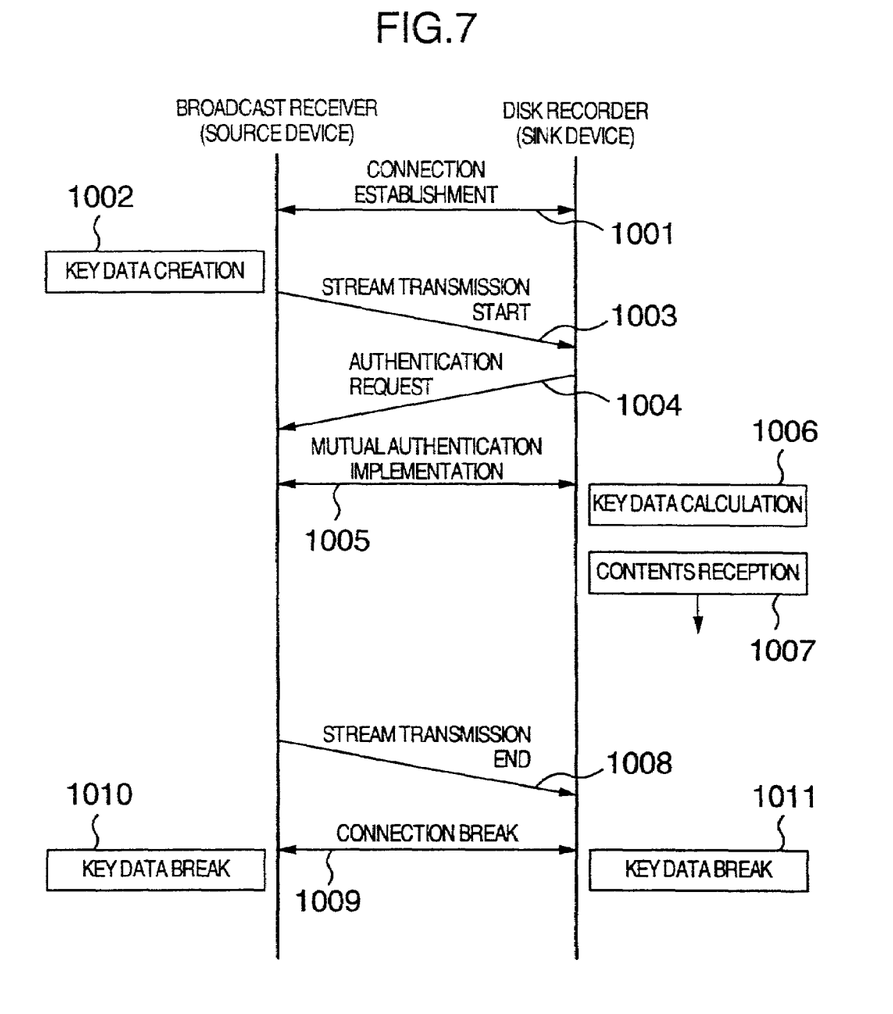
FIG. 7 is a diagram showing a sequence of procedures of data transmission between the stream data recording and playback apparatus and the digital satellite broadcast receiving apparatus according to an embodiment of the invention.

FIG. 7 shows transmission procedures when contents applied with limitation on copy is transmitted from the digital satellite broadcast receiver set 3 to the disk recorder 1 in the AV system shown in FIG. 1. In FIG. 7, when a stream is to be transmitted from the satellite broadcast receiver set 3 to the disk recorder 1, a connection is first established between the output plug of satellite broadcast receiver set 3 and the input plug of disk recorder 1 as described previously (procedure 1001), key data for encrypting the contents is created by the satellite broadcast receiver set 3 representing the source side (procedure 1002) and the stream applied with a scramble process by the key data is started to be transmitted onto the bus (procedure 1003). When receiving the stream undergoing the scramble process, the disk recorder 1 representing the sink side makes a request for authentication to the source side (procedure 1004), so that partner authentication is mutually carried out between the source and sink sides to interchange the key data (procedure 1005). When the authentication is successful, the sink side is allowed to calculate the key data for contents encryption and calculates its value (step 1006), thus being permitted to decrypt and receive the stream transmitted from the source side (procedure 1007).

Figure 8:
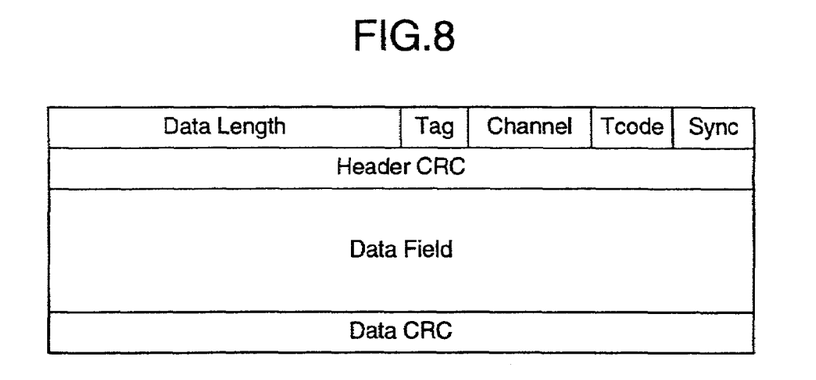
FIG. 8 is a diagram showing a transmission packet format of stream data.

To end the transmission of the stream, the stream from the source side is stopped (procedure 1008), the connection between the source and sink is broken (procedure 1009) and the key data on the respective source and sink sides is broken (procedures 1010 and 1011). For limitation on copy of contents, there are provided four levels of "copy free", "copy never", "copy one generation" and no more copies" and these levels are identified by using copy control information. FIG. 8 shows a format of a data packet in the isochronous transfer mode used to transfer stream data on the 1394 bus. The packet consists of header information of 32 bits, a header CRC, a data field and a data CRC. The header information has a data length field of 16 bits indicating a length of the packet, a tag field used for identifying the packet data format, a channel field indicating an isochronous channel number used for transmission of the packet, a Tcode indicating the kind of transaction of the packet and a Sync field used for synchronization of data. Of these fields, the Sync field has upper two bits used to provide individual values representative of the aforementioned four levels, so that the copy control information of contents transmitted in the form of a stream can be identified.

Contents of or subject to "copy free" is freed from limitation on copy so as to be able to be freely transmitted and received by any apparatus and need not be scrambled when transmitted/received to/from the bus. Contents of or subject to other three levels "copy never", "copy one generation" and "no more copies" is applied with limitation on copy and needs to be scrambled when transmitted on the bus. Contents of "copy never" cannot be received by the recording apparatus such as the disk recorder or VTR and stored in a medium. Therefore, for example, only when recording operation is not carried out as in such a case where a stream is transmitted from the satellite broadcast receiver set to the digital TV and played back or watched and listened, the transmitted stream can be received. Contents of "copy one generation" is allowed to be recorded with the recording apparatus but in case the contents is once recorded and thereafter reproduced from the recording apparatus so as to be transmitted, the contents must be transmitted with its copy control information changed to "no more copies". For the contents of "no more copies", only indication of created data is permitted as in the case of "copy never". In the apparatus having the information for authentication, the processing of contents conforming to the aforementioned copy control information is correctly practiced without fail, thereby preventing contents subjected to limitation on copy from being copied without authorization in the DTCP scheme.

Next, operation carried out when contents recorded on the disk recorder according to the embodiment of the invention is transcribed (or moved) to the digital VTR will be described. It is meant by "transcription" that contents is moved from an apparatus on the source side to the sink side by transmitting the contents from the apparatus on the source side to an apparatus on the sink side, whereby the apparatus on the sink side records the received contents and at the same time, the apparatus on the source side having transmitted the contents deletes the contents or whereby after confirming that the apparatus on the sink side has recorded the received contents, the apparatus on the source side deletes the contents.

Figure 9:
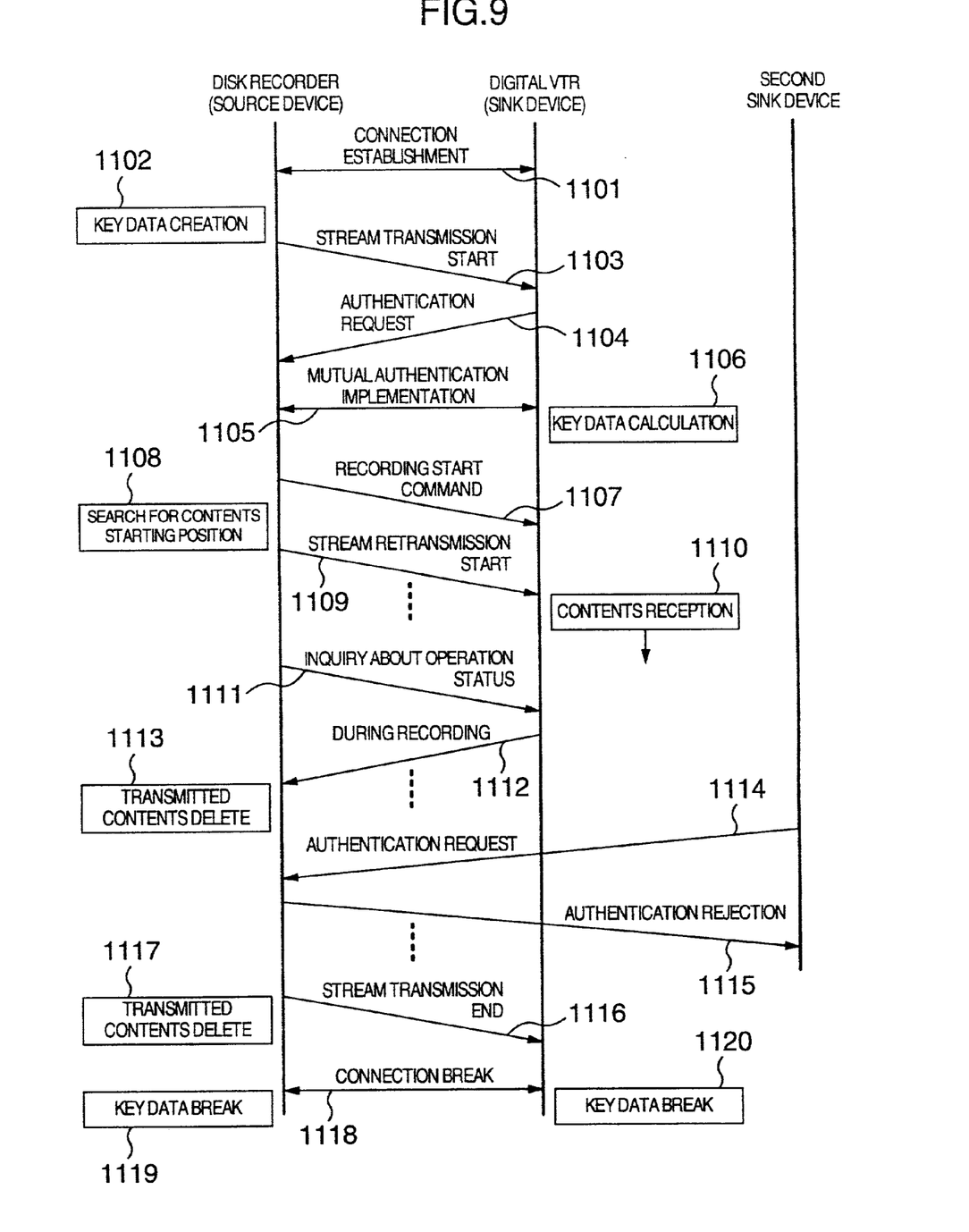
FIG. 9 is a diagram showing a sequence of procedures of data transmission between the stream data recording and playback apparatus and another recording apparatus according to an embodiment of the invention.

FIG. 9 shows procedures for transmission of a stream when transcription is conducted. In this example, contents subject to "no more copies" recorded on the disk recorder 1 shown in FIG. 1 is transcribed to the digital VTR 2. When transcription of the contents to the digital VTR 2 is commanded to the disk recorder 1 through an operation of the panel or remote controller by the user or by reception of a command from another apparatus, the disk recorder 1 established a connection between the disk recorder 1 and the digital VTR 2 (procedure 1101), creates key data for scramble (procedure 1102) and starts transmission of a stream added with copy control information of "copy one generation" (procedure 1103). The stream at that time is not always a stream per se inclusive of the contents to be transcribed but may be a stream inclusive of, for example, a dummy blank signal. Receiving the stream, the digital VTR 2 makes a request for authentication to the disc recorder 1 (procedure 1104) so as to carry out mutual partner authentication between the source and sink and when the authentication is successful between them (procedure 1105), the sink side is permitted to create the key data through calculation (procedure 1106) and the key data for scrambling the contents can be possessed in common. Subsequently, the disk recorder 1 transmits a command for placing the digital VTR 2 in recording condition (procedure 1107), performs a search for starting position of the contents to be transcribed (procedure 1108) and starts transmission of the stream added with the control information "copy one generation" by scrambling the contents, beginning with its head portion (procedure 1109). The digital VTR 2 receives and scrambles the transmitted stream to record it as information subject to "no more copies" on a tape (procedure 1110). Namely, the stream added with the copy control information when the stream is once recorded initially on the disk recorder 1 is transmitted to the digital VTR 2 and recorded thereon and thereafter, the stream is deleted from the disk recorder 1 representing an original recording medium.

Instead of causing the digital VTR 2 to start recording by sending the command to the digital VTR 2, the panel or remote controller of digital VTR 2 may be operated to place the digital VTR 2 in recording condition and thereafter the disk recorder 1 may be operated to start the stream transmission. At that time, by displaying a message of, for example, "Please place VTR in recording condition." in user interface information created by the disk recorder to make the transmission start ready to be operated, an operation method can be presented to the user comprehensibly.

During the contents transmission, the disk recorder 1 periodically transmits a command to the digital VTR 2 to examine its operation status (procedure 1111) and checks that a response purporting that recording is in operation returns from the digital VTR 2 (procedure 1112). Then, if it is determined that the recording operation continues normally, the contents the transmission of which has finished till then is deleted from the disk (procedure 1113). On the other hand, in the event that the recording operation of digital VTR 2 is stopped owing to an operation by the user or for other reasons and the stoppage is detected by way of, for example, a response to the command or in the event that the connection between the disk recorder and digital VTR cannot persist for reasons such as draw-out or disconnection of the cable of 1394 bus, the transmission of the stream is stopped and thereafter, the contents scheduled to be transcribed is held in the disk. By deleting the contents little by little during operation of transcription in this manner, the operation can be stopped immediately before the end of transcription operation and the transcription operation can be recommenced from the beginning to prevent many sheets of copies from being prepared easily and to prevent data desired to be transcribed from collapsing when recording of the contents cannot proceed in the digital VTR 2 for some reasons.

In case a request for authentication is made during the transcription operation by such a sink device other than the digital VTR 2 that has initially carried out the authentication as the digital TV, another digital VTR or another disk recorder (procedure 1114), the request is rejected (procedure 1115), thereby preventing a plurality of copies from being created in addition to the transcription.

When transmission of all contents to be transcribed ends, the disk recorder stops transmitting the stream (procedure 1116), deletes contents remaining in the disk of disk recorder 1 (procedure 1117) and breaks the connection (procedure 1118). Through this, the key for contents scramble possessed in common by the two parties is broken (procedures 1119 and 1120) and the transcription operation ends.

In the manner described as above, the contents of "no more copies" recorded on the disk recorder 1 can be transcribed to the digital VTR 2 while preventing the problem that the contents is recorded concurrently on other recording apparatus and a plurality of copies are created. On the other hand, the digital VTR 2 side need not consider that the operation is transcription and may perform the same operation as normal recording of contents of "copy one generation". For contents of "copy free" not applied with limitation on copy, the transcription operation as above is not always necessary and contents remaining after completion of normal copying may be deleted. But, if the contents is deleted little by little similarly to the transcription of the contents applied with limitation on copy as described above, the operation by the user can be simplified.

In case a plurality of write-once contents are designated precedently as to be transcribed, it suffices that after transmission of one contents ends, a command for placing the VTR once in pause condition may be transmitted, the pause may be released when the next contents is ready to be transmitted and thereafter the transmission of the contents may be started. In this manner, occurrence of blanking between contents on the tape of digital VTR 2 can be prevented.

Figure 10:
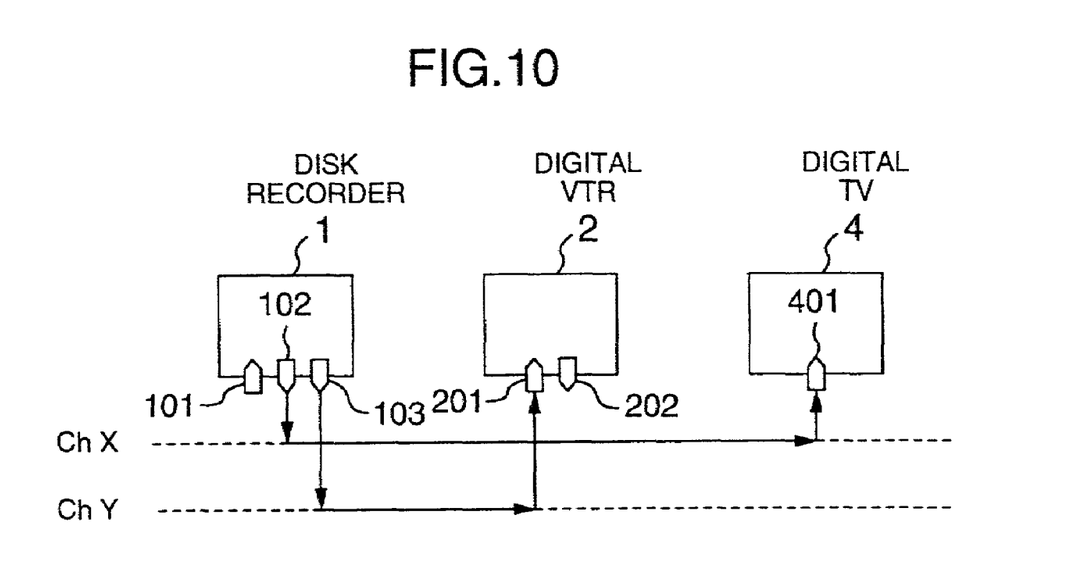
FIG. 10 is a diagram showing a method for data transmission between the stream recording and playback apparatus and the digital satellite broadcast receiving apparatus and digital TV according to an embodiment of the invention.

FIG. 10 shows an operation status when transcription is executed while monitoring a stream transmitted from the disk recorder 1 to the digital VTR 2 by means of the digital TV 4. Firstly, a connection is established between the output plug 102 of disk recorder 1 and the input plug 401 of digital TV 4 by using a channel X and through a panel operation or remote control operation of the disk recorder 1 or an operation of the digital TV 4 side from the control application, the contents of contents to be transcribed from the disk recorder 1 is confirmed and selected. Then, when the transcription to the digital VTR 2 is commanded to the disk recorder 1 through any one of the above methods, the disk recorder 1 establishes a new connection between an output plug 103 of disk recorder 1 and the input plug 201 of digital VTR 2 by using a channel Y other than the channel X used by the connection which has already been established between the disk recorder 1 and the digital TV 4 and executes a transcription operation with respect to the digital VTR 2 similarly to the procedures shown in FIG. 9. For practicing the transcription, the connection established with respect to the digital TV may be broken or the transmission of the stream may be stopped while holding the connection to continue transmission of an empty packet. Alternatively, a 1394 interface capable of performing simultaneous transmission of two channels may be used to transmit a stream subject to "no more copies" to the digital TV 4 while transmitting the same contents subjected to "copy one generation" to the digital VTR 2, thereby practicing transcription. In this case, the contents being transcribed can be monitored simultaneously on the digital TV 4.

A channel different from the connection that has already been established with respect to the digital TV, for instance, can be used in this manner, so that even when a recording apparatus other than the digital TV has already been overlay-connected to the same channel, contents to be transcribed to that recording apparatus can be prevented from being recorded. Further, by using the 1394 interface capable of delivering two channels simultaneously, contents being transcribed can be monitored with the digital TV.

In the foregoing examples, embodiments have been described in which the present invention is applied to the unitary disk recorder apparatus. The stream data recording and playback apparatus of the invention is not limited to the foregoing examples but may be a composite apparatus integrally formed of, for example, the satellite broadcast receiver set and the disc recorder and even in that case, the digital VTR can be connected with the 1394 bus to implement the transcription of contents in quite a similar way. The foregoing embodiments have been described by way of example of the recording and playback of the stream data exemplified by a multiplexed video and audio data stream but regardless of the kind of stream data, the present invention can also be applied to a recording and playback apparatus for recording and playing back a stream of only image, a stream of only voice, a stream of data broadcast described by XML (extended Markup Language) or a stream resulting from multiplexing these streams.

According to the invention, contents once recorded by the stream data recording and playback apparatus and subjected to limitation on copy can be transcribed to another stream data recording and playback apparatus and at that time, there is no fear of preparation of an unauthorized copy.

The invention claimed is:

1. A streaming data playback apparatus comprising:
   a playback circuit which reproduces streaming data from a recording medium;
   an interface circuit which performs a scramble process on the streaming data reproduced by the playback circuit and adds copy control information to the scrambled streaming data for transmission to a destination apparatus;
   wherein the interface circuit exchanges key information used for the scramble process and a descramble process with the destination apparatus for the streaming data by performing an authentication process with the destination apparatus; and
   during transmission of the streaming data from the recording medium to the destination apparatus, the interface circuit changes the copy control information, refuses to perform an authentication process with any apparatus other than the destination apparatus, and after the transmission of the streaming data, deletes the streaming data on the recording medium,
   wherein the copy control information is changed to copy-prohibited status when the streaming data is retained on the recording medium for playback after transmission and the copy control information is changed to copy-permitted status when the streaming data is deleted from the recording medium after transmission.

2. A streaming data playback apparatus comprising:
   a playback circuit which reproduces streaming data from a recording medium;
   an interface circuit which performs a scramble process on the streaming data reproduced by the playback circuit and adds copy control information to the scrambled streaming data for transmission to a destination apparatus;
   wherein the interface circuit establishes a channel to the destination apparatus of the streaming data for transmission of the streaming data;
   wherein the interface circuit exchanges key information used for the scramble process and a descramble process with the destination apparatus by performing an authentication process with the destination apparatus; and
   wherein when transmitting the streaming data from the recording medium to the destination apparatus, the interface circuit changes the copy control information, disconnects channels other than the channel used for transmitting the streaming data to the destination apparatus, and after the transmission of the streaming data, deletes the streaming data on the recording medium,
   wherein the copy control information is changed to copy-prohibited status when the streaming data is retained on the recording medium for playback after transmission and the copy control information is changed to copy-permitted status when the streaming data is deleted from the recording medium after transmission.

3. The streaming data playback apparatus according to claim 2, wherein, when transmitting the streaming data to the destination apparatus on the channel, the interface circuit refuses to authenticate any apparatus which tries to share the key information used in the channel.

4. A streaming data playback apparatus comprising:
   a playback circuit which reproduces streaming data from a recording medium;
   an interface circuit which performs a scramble process on the streaming data reproduced by the playback circuit and adds copy control information to the scrambled streaming data for transmission to at least a first and a second destination apparatus;
   wherein the interface circuit establishes a first channel to a first destination apparatus of the streaming data for transmitting the streaming data, and a second channel to a second destination apparatus of the streaming data for transmitting the same streaming data;
   wherein the interface circuit exchanges first key information used for the scramble process and a descramble process with the first destination apparatus by performing an authentication process with the first destination apparatus, and exchanges second key information, different from the first key information, used for the scramble process and the descramble process with the second destination apparatus by performing the authentication process with the second destination apparatus; and
   when transmitting the streaming data from the recording medium to the at least first and second destination apparatus, the interface circuit adds to the scrambled streaming data on the first channel the copy control information indicating that the transmitted streaming data may be recorded into a recording device, and the interface circuit changes the copy control information, adds to the scrambled streaming data on the second channel the copy control information indicating that the transmitted streaming data can not be recorded by a recording device, and deletes the streaming data on the recording medium after the streaming data transmission,
   wherein the copy control information is changed to copy-prohibited status when the streaming data is retained on the recording medium for playback after transmission and the copy control information is changed to copy-permitted status when the streaming data is deleted from the recording medium after transmission.

5. The streaming data playback apparatus according to claim 4 wherein the first destination apparatus comprises a recording device and the second destination apparatus comprises a display device.

6. A streaming data playback apparatus comprising:
   a playback circuit which reproduces streaming data from a recording medium;
   an interface circuit which performs a scramble process on the streaming data reproduced by the playback circuit and adds copy control information to the scrambled streaming data for transmitting the scrambled streaming data and the copy control information to a recording device;
   wherein when transmitting the streaming data, the interface circuit changes the copy control information added to the scrambled streaming data to copy-prohibited status when the streaming data is retained on the recording medium for playback after the streaming data transmission and the interface circuit changes the copy control information added to the scrambled streaming data to copy-permitted status when the streaming data on the recording medium is deleted from the recording medium after transmission of the streaming data, and when the data transmitted is deleted from the recording medium, the interface circuit interrupts the recording operation and changes the copy control information to the copy-permitted status, and when the interface circuit detects that the transmission of the streaming data fails to proceed, reading of the data is stopped and the data remaining on the recording medium at that moment is retained.

* * * * *